(No Model.)
J. P. FULGHAM.
SEAT FOR GRAIN DRILLS.
No. 302,994. Patented Aug. 5, 1884.
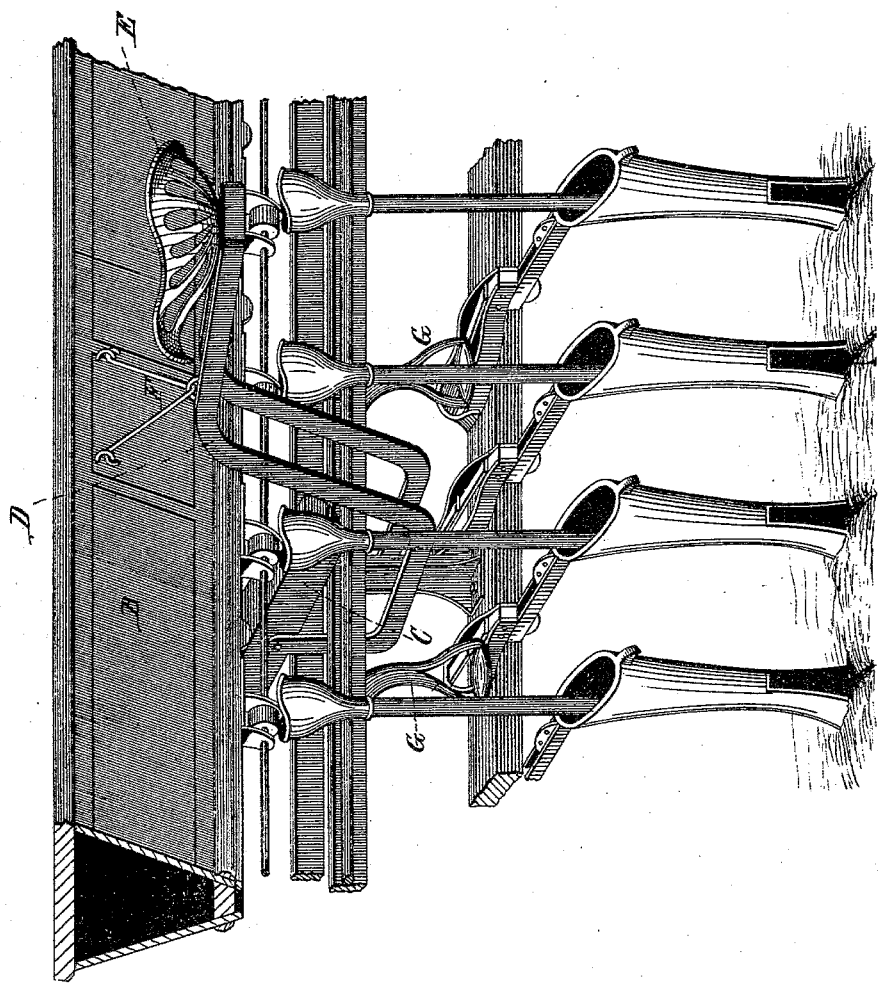
Witnesses:
W. C. Jirdinstow
Fred F. Church
Inventor:
Jesse P. Fulgham
by
Church & Church
his Attorneys.

UNITED STATES PATENT OFFICE.

JESSE P. FULGHAM, OF RICHMOND, INDIANA, ASSIGNOR OF ONE-HALF TO THE WAYNE AGRICULTURAL COMPANY, OF SAME PLACE.

SEAT FOR GRAIN-DRILLS.

SPECIFICATION forming part of Letters Patent No. 302,994, dated August 5, 1884.

Application filed January 3, 1884. (No model.)

*To all whom it may concern:*

Be it known that I, JESSE P. FULGHAM, of Richmond, in the county of Wayne and State of Indiana, have invented a certain new and Improved Seat for Grain-Drills; and I do hereby declare the following to be a full, clear, and exact description of the same, reference being had to the accompanying drawing, forming part of this specification, and to the figures and letters of reference marked thereon.

My invention relates to that class of agricultural implements known as "grain-drills;" and it consists in the manner of supporting and arranging the driver's seat in the rear of the hopper, whereby he is enabled to watch and observe the operation of the feeding devices as well as the hoes or teeth, as hereinafter described and claimed.

The figure in the drawing represents a grain-drill with my invention applied thereto.

E is the driver's seat, supported on the bifurcated frame D in the rear of the hopper B. The frame D is curved, as shown, in order to pass under the hopper B, and its forward ends are bent upward for attachment to the tongues C or other suitable portion of the main frame by bolts, hooks, or in any well-known manner.

At or near the upper bend or knee of the seat support or frame D is a loop or hook for the reception of a stirrup or link, F, which in the present instance is shown as a V-shaped bar attached at the angle to the seat-support, the two ends terminating in eyes or hooks passing through staples or loops on the hopper. This form of link is especially adapted to prevent violent lateral vibration. Stirrups or foot-rests G G are fastened to the cross-rail or other portion of the frame convenient to the driver's seat. By this arrangement the seat is firmly supported and maintained in a position most favorable for watching the operation of the machine, and at the same time without interfering with the arrangement of the other parts of the machine. It is simple and efficient, and requires no especial skill in applying it to machines already in use.

I claim as my invention—

1. In a grain-drill, and in combination with the main frame or tongue, a detachable seat support or frame and a brace for attachment to the hopper, substantially as described.

2. In a grain-drill, the seat-support projecting under and to the rear of the hopper and attached to the tongue or main frame and to the hopper, substantially as described.

3. In a grain-drill, and in combination with the main frame, the seat-support secured to the tongue and hopper, and the stirrups, substantially as described.

4. In a grain-drill, and in combination with the main frame or tongue, the bifurcated seat-support extending beneath and in rear of the hopper, and the V-shaped link or brace for attachment to the hopper, substantially as described.

5. In a grain-drill, and in combination with the main frame and hopper thereof, the curved seat-support passing beneath the hopper and cross-bar of the main frame, and provided with bent ends for attachment to the tongue, with a link or loop for attachment to the rear of the hopper, substantially as described.

JESSE P. FULGHAM.

Witnesses:
DONALD R. MACGREGOR,
THADDEUS WRIGHT.